United States Patent
Pinault

(10) Patent No.: US 8,458,135 B2
(45) Date of Patent: Jun. 4, 2013

(54) DATA BACKUP SYSTEM

(75) Inventor: Francis Pinault, Bois-Colombes (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/319,917

(22) PCT Filed: Apr. 15, 2010

(86) PCT No.: PCT/EP2010/054956
§ 371 (c)(1),
(2), (4) Date: Dec. 9, 2011

(87) PCT Pub. No.: WO2010/133408
PCT Pub. Date: Nov. 25, 2010

(65) Prior Publication Data
US 2012/0078851 A1      Mar. 29, 2012

(30) Foreign Application Priority Data
May 18, 2009   (FR) ...................................... 09 53277

(51) Int. Cl.
*G06F 7/00*      (2006.01)
(52) U.S. Cl.
USPC ...................................................... 707/652

(58) Field of Classification Search
USPC ........ 707/652, 644; 709/219; 711/162; 714/1
See application file for complete search history.

(56) References Cited

U.S. PATENT DOCUMENTS

| | | | | |
|---|---|---|---|---|
| 7,472,241 | B2 * | 12/2008 | Uchiyama et al. | 711/162 |
| 7,844,686 | B1 * | 11/2010 | Keith, Jr. | 709/219 |
| 7,945,816 | B1 * | 5/2011 | Gardner | 714/43 |
| 8,041,677 | B2 * | 10/2011 | Sumner et al. | 707/640 |
| 2005/0125467 | A1 * | 6/2005 | Oosaki et al. | 707/204 |

FOREIGN PATENT DOCUMENTS

WO      2006056681      6/2006

* cited by examiner

*Primary Examiner* — Pierre Vital
*Assistant Examiner* — Courtney Harmon
(74) *Attorney, Agent, or Firm* — Carmen Patti Law Group, LLC

(57) ABSTRACT

In order to back up a user's set of data (Ens) through a telecommunications network (RT), a terminal (TC) retrieves, from an application server (SA), a table (Tab) containing sets of risk factors ($Fr_n$) respectively associated with backup servers ($SV_n$), assigns a trust level ($K_n$) to each backup server ($SV_n$) identified in the table (Tab) based on the set of risk factors ($Fr_n$) associated with the backup server ($SV_n$), selects at least three backup servers based on the trust levels ($K_n$) respectively assigned to the backup servers ($SV_n$), and transmits the set of data (Ens) to each selected backup server ($SV_n$), which saves the set of data.

9 Claims, 2 Drawing Sheets

DATA BACKUP SYSTEM

TECHNICAL FIELD

The present invention pertains to a data backup system, and more particularly to servers capable of providing a data backup service.

BACKGROUND

Currently, there is a need to back up data by guaranteeing their integrity and availability over time. Such a data backup generally requires a complex infrastructure whose cost depends on the sensitivity of the data and the duration of the desired storage.

Existing solutions offer secure downloading of the data, a signing of the data, and a saving of the data within at least two new remote sites in order to avoid any consequences of incidents, such as earthquakes, floods, or terrorist actions. Such solutions require very high cost infrastructure, for example related to the buildings' structures, the air-conditioned air, the controlled atmosphere, the security guards if any, or the information security procedures. Furthermore, the same set of data is often copied into a certain number of copies (generally eight) in order to compensate for any electronic failures within the storage means.

SUMMARY

One object of the invention Is to remedy the aforementioned drawbacks by proposing a data backup system guaranteeing the integrity and availability of data over time with a minimal cost for the user.

In order to achieve this goal, a method for backing up a user's set of data over a telecommunications network is characterized in that it comprises the following steps within a terminal:

retrieving, from an application server, a table containing sets of risk factors respectively associated with backup servers, assigning a trust level to each backup server identified within the table based on the set of risk factors associated with the backup server, selecting at least three backup servers based on the trust levels respectively assigned to the backup servers, and transmitting all of the data to each selected backup server, which saves the set of data.

Advantageously, the invention makes it possible to considerably reduce the data storage costs while guaranteeing the integrity and availability of data over time. The user, for private or professional reasons, may thereby back up the data, such as critical, confidential, or personal data, in a safe and lasting manner. Furthermore, the user no longer needs to use his or her own database system and worry about the risks of losing data.

According to other characteristics of the invention, the backup servers may furthermore be selected based on a backup quality requested by the user, the backup quality potentially being determined by at least one of the following parameters including the private, public or professional status of the operator managing each backup server, the desired backup duration of the set of data, and a reliability factor requested by the user with respect to the storage of the set of data. Furthermore, each set of risk factors related to a backup server may comprise at least one factor from among an earthquake risk factor, a cyclone risk factor, a flooding risk factor, a temperature scale factor, and a political stability factor. It shall be understood that the list of risk factors is not limiting, and may be extended based on the change in technologies and restrictions related to the presence of a backup server within a specific location.

The invention also pertains to a terminal for backing up a user's set of data by means of a telecommunications network, characterized in that it comprises:

means for retrieving, from an application server, a table containing sets of risk factors respectively associated with backup servers, means for assigning a trust level to each backup server identified within the table based on the set of risk factors associated with the backup server, means for selecting at least three backup servers based on the trust levels respectively assigned to the backup servers, and means for transmitting the set of data to each selected backup server, which saves the set of data.

The invention also pertains to an application server for backing up a users set of data over a telecommunications network, characterized in that it comprises means for determining sets of risk factors respectively associated with backup servers, and transmitting a table containing said set of risk factors to a terminal, so that the terminal can assign a trust level to each backup server identified within the table based on the set of risk factors, and transmit a set of data to at least three selected backup servers based on the trust levels respectively assigned to the backup servers.

The invention also pertains to a computer program capable of being implemented within a server, said program comprising instructions which, whenever the program is executed within said server, carry out the steps according to the inventive method.

DESCRIPTION OF THE DRAWINGS

The present invention and the benefits thereof shall be better understood upon examining the description below, which makes reference to the attached figures, in which.

DETAILED DESCRIPTION

Figure 1:
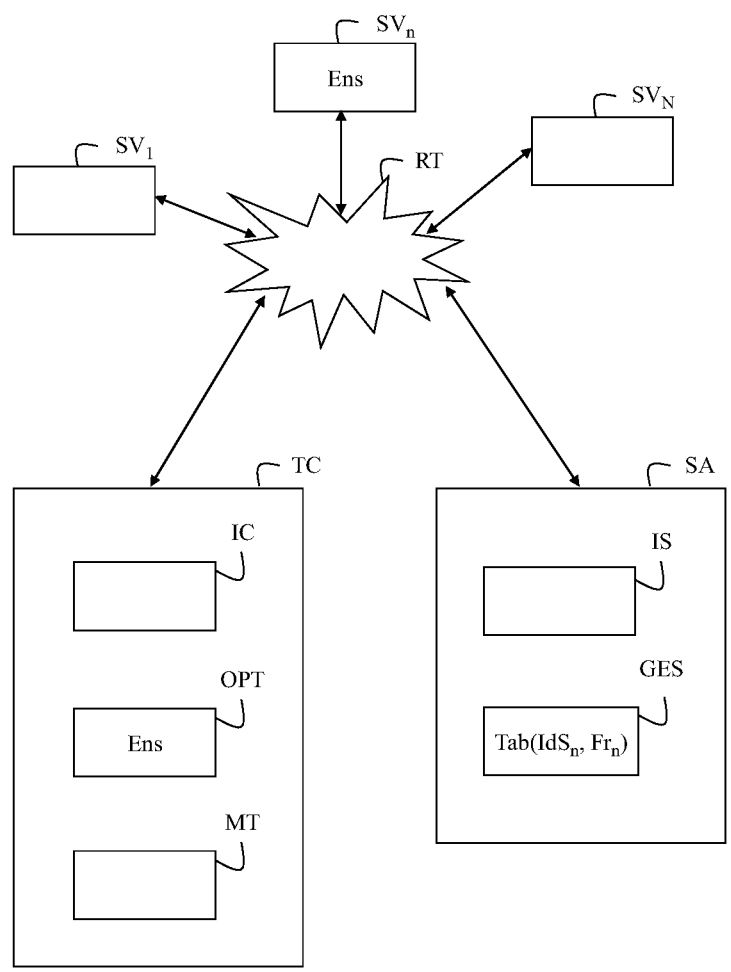
FIG. 1 is a schematic block diagram of a data backup system according to one embodiment of the invention.

With reference to FIG. 1, a data backup system comprises a communication terminal TC, an application server SA and a set of backup servers $SV_1$ to $SV_N$, capable of communicating with one another through a telecommunications network RT.

The telecommunications network RT may be a wired or wireless network, or a combination of wired and wireless networks.

According to one example, the telecommunications network RT comprises a network of high-speed IP packets ("Internet Protocol" in English), such as the Internet or an intranet, or a private network specific to a company supporting a proprietary protocol.

The communication terminal TC may be a personal computer or an intelligent terminal that may communicate with the packet network via a wired or wireless connection.

By way of example, a communication terminal TC may comprise a device or electronic telecommunications object which is personal to the user and which may be a communicating Personal Digital Assistant (PDA) or a smartphone, which may be connected to an access terminal of a smallrange WLAN ("Wireless Local Area Network") wireless network or one compliant with one of the 802.1x standards, or to an access terminal of a medium-range network compliant with the WIMAX ("Worldwide Interoperability Microwave Access") protocol. The communication terminal TC may be a mobile cellular radio communications terminal capable of accessing a GSM ("Global System for Mobile communications") or UMTS ("Universal Mobile Telecommunications System") radio communication network.

The set of backup servers $SV_1$ to $SV_N$ comprises at least N=3 servers. The servers may be respectively managed by different operators, or partially or fully managed by a single operator.

Each backup server $SV_n$, where $1 \leq n \leq N$, is capable of saving data transmitted from the communication terminal TC. The saved data may be of any type, such as critical, confidential, or personal data, in any format, such as a text, audio, or video format.

Each backup server $SV_n$ has the functionality of saving and storing data, and of returning that data in the format in which it had initially been saved. Furthermore, each server $SV_n$ is capable of saving a set of data Ens to match an identifier IdE which may be a reference determined by the user, and makes that set of data Ens accessible by means of the identifier IdE.

The application server SA contains in interface server IS and a management module GES.

The IS server interface has the functionality of establishing communication with the communication terminal TC and of providing the user of the communication terminal with a data backup service.

The management module GES has the functionality of retrieving information from backup servers $SV_n$ capable of providing a data backup service.

Based on the retrieved information, the management module GES assigns each server $SV_n$ an identifier $IdS_n$ and a set of risk factors $Fr_n$ comprising, for example:
an earthquake risk factor,
a cyclone risk factor,
a flooding risk factor,
a temperature scale factor, and
a political stability factor.

The management module GES establishes a lookup table Tab in which identifiers $IdS_n$ of backup servers are respectively saved as matches for sets of risk factors $Fr_n$.

Optionally, the management module GES assigns a trust level $K_n$ to each server $SV_n$ based on the set of factors associated with the server $SV_n$. The trust level $K_n$ defines a reliability of the data backup by the server $SV_n$ with respect to risks of backed-up data being destroyed, or of information being lost within the saved data.

The trust level $K_n$ may be determined, for example, in a probabilistic fashion, based on information related to the backup servers. For each backup server, the risk factors may be provided directly by the operator who manages the server, or obtained by any other means from information related to the backup servers. According to one example, the operator of a backup server $SV_n$ provides an earthquake risk factor related to the backup server, and the application server SA uses that information directly. According to another example, the application server SA determines the location of a backup server $SV_n$ and determines an earthquake risk factor related to the backup server based on said location, and information about the earthquake risks within the region corresponding to that location, this information potentially being obtained in various manners, for example, from databases or from official bodies.

The communication terminal TC comprises a client interface IC for establishing a communication with the server interface IS of the application server SA and with backup servers $SV_n$.

The client interface IC has the feature of analyzing and comparing the integrity of a single set of data Ens backed up in each of the selected backup servers. The client interface IC thereby determines the reliability of the backup servers in order to keep or abandon backup servers.

Furthermore, the client interface IC makes use of an authentication mechanism for all communication with a backup server.

The communication terminal TC further comprises an optimization module OPT which has the feature of determining backup servers $SV_n$ capable of providing a data backup service by means of a data backup algorithm, particularly using predetermined restrictions related to the user.

The data backup algorithm determines a number NS of backup servers to use based on a quality Q and a trust level $K_n$ assigned to each backup server $SV_n$, the number NS being greater than or equal to 3. In particular, the algorithm compares the trust level $K_n$ of each server in order to select the number NS of backup servers to be used based on the quality Q requested by the user.

A backup quality Q is defined based on at least one of the following parameters:
the private, public, or professional status of the operator managing each backup server,
the desired backup duration of the set of data, and
a reliability factor, for example 99.99% or 99.999%.

Some parameters are, for example, provided by the user, such as the data backup duration desired by the user. The reliability factor may also be directly provided by the user or deduced from information provided by the user and from the nature of the data to be backed up.

According to one example, a user may wish to back up images, such as personal photographs, for private purposes, for fifty years, with a low data backup guarantee restriction, and the algorithm thereby determines a reliability factor of about 99.9%.

According to another example, a user may wish to back up confidential data, such as work documents, for professional purposes, for ten years, with a high data backup guarantee restriction, and the algorithm thereby determines a reliability factor of about 99.999%.

The trust level $K_n$ assigned to each backup server $SV_n$ may be provided by the application server SA or determined by the communication terminal TC based on sets of risk factors $Fr_n$ respectively associated with servers $SV_n$ provided by the application server SA.

The communication terminal TC further comprises an upload/download module MT for uploading the same set of data Ens from the communication terminal TC to each of the selected backup servers.

Optionally, the upload/download module MT has the feature of encrypting the set of data Ens to be saved. Thus, the upload/download module MT encrypts data before transmitting it to a backup server and decrypts that same data whenever it is retrieved from the backup server.

The upload/download module MT can reserve a memory space within a backup server in order to carry out a data-save test. For example, the module MT asks the backup server to save temporary data having the same size as the set of data Ens to be saved within a memory space, and if that save is successful, the backup server saves said set of data Ens within said memory space.

The upload/download module MT assigns an identifier IdE to each set of data Ens to be saved, and associates keywords with the identifier IdE in order to characterize and index the set of data. For example, the user is invited to enter keywords that will enable him or her to locate the set of data Ens that he or she wishes to back up.

Figure 2:
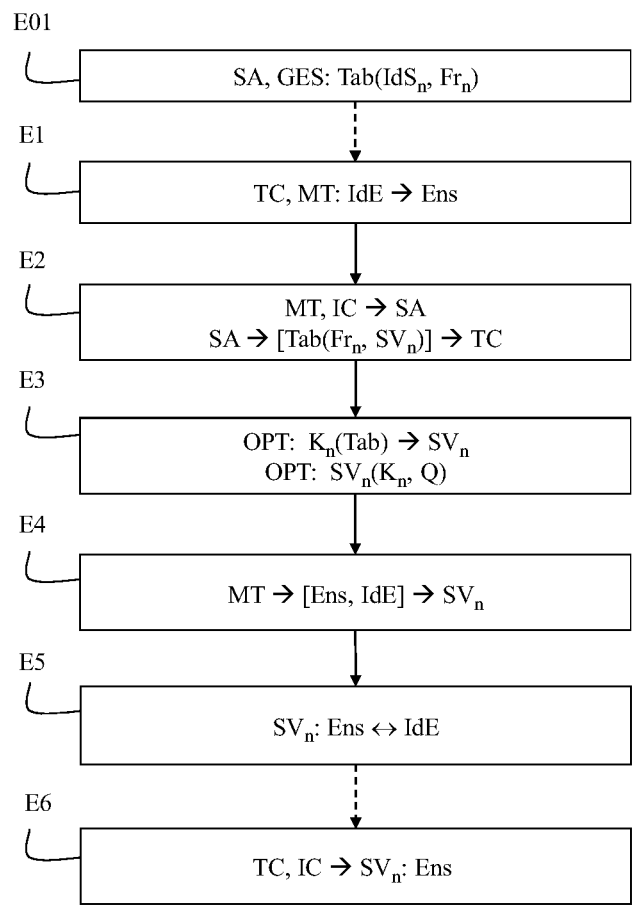
FIG. 2 is an algorithm of a data backup method according to one embodiment of the invention.

With reference to FIG. 2, a method for backing up a user's data according to one embodiment of the invention comprises steps E1 to E6 executed within the data backup system.

In a preliminary step E01, the management module GES of the application server SA retrieves information about backup servers $SV_n$ capable of providing a data backup service. In particular, the management module GES determines a set of risk factors $Fr_n$ based on the retrieved information, said set of risk factors comprising, for example, an earthquake risk factor, a cyclone risk factor, a flooding risk factor, a temperature scale factor, and a political stability factor. The management module GES assigns to each server $SV_n$ an identifier $IdS_n$ associated with the determined set of factors $Fr_n$. The identifiers $IdS_n$ of backup servers are respectively saved as matches for the sets of factors $Fr_n$ within a lookup table Tab.

An identifier $IdS_n$ of a backup server particularly contains an IP ("Internet Protocol") address of the backup server and a physical address indicating, for example, the town in which the server is located.

Optionally, the management module GES assigns a trust level $K_n$ to each server $SV_n$ based on the set of risk factors $Fr_n$ associated with the server $SV_n$.

In step E1, the user wishes to perform a backup of a set of data Ens that is present within a memory of the communication terminal TC.

The upload/download module MT of the communication terminal TC invites the user to determine keywords, for example orally by dictating them, or manually by inputting them using a keyboard, in order to characterize and index the set of data Ens. The upload/download module MT assigns an identifier IdE to the set of data Ens and associates the previously determined keywords with the identifier IdE. The identifier IdE may be a reference that the user defines himself or herself, or a reference created automatically by the upload/download module MT based on the keywords.

In step E2, the upload/download module MT transmits a request to the application server SA via the client interface IC in order to retrieve information about backup servers. In response to the request, the application server SA transmits to the communication terminal TC a lookup table Tab containing sets of risk factors $Fr_n$ related to backup servers $SV_n$. Optionally, the lookup table Tab contains a trust level $K_n$ assigned to each backup server $SV_n$.

In step E3, the optimization module OPT assigns a trust level $K_n$ to each backup server $SV_n$ identified within the table Tab based on the set of risk factors $Fr_n$ respectively associated with the backup server $SV_n$. If the lookup table Tab already contains trust levels $K_n$ assigned to the servers $SV_n$, the optimization module OPT may use these trust levels present within the table, or determine new trust levels anyway, which may be different from the trust levels present within the table, by using another determination method.

The optimization module OPT determines backup servers $SV_n$ capable of providing a data backup service, particularly by using predetermined restrictions related to the user. The optimization module OPT determines a number NS of backup servers that is greater than or equal to three, based on a backup quality Q that particularly reflects predetermined restrictions related to the user and trust levels $K_n$ respectively assigned to the backup servers $SV_n$. As previously indicated, the backup quality Q is particularly determined based on at least one of the following parameters including the user's private or professional status, the desired backup duration of the set of data, and a reliability factor, for example 99.99% or 99.999%, requested by the user with respect to storing the set of data.

By way of example, the optimization module OPT uses an algorithm that takes as input the various trust levels $K_n$ of the backup servers, and selects a minimum number NS of backup servers $SV_n$ based on the quality Q requested by the user. Particularly, the combination of selected backup servers satisfies an overall level of trust corresponding to the quality Q requested by the user. The optimization module OPT can propose multiple different combinations of backup servers whose number is greater than or equal to three.

For example, the greater the reliability F requested by the user, the higher the minimum number NS of backup servers shall be assumed to be.

For example, the backup servers may be selected in such a way that each server is located a minimum distance away from each of the other servers.

In step E4, the upload/download module MT transmits the set of data Ens, and the associated identifier IdE, to each selected backup server, $SV_n$, for example, nearly simultaneously or within a very short interval of time. The data is optionally encrypted before being transmitted to the backup servers.

In step E5, each backup server $SV_n$ saves the set of data Ens as a match for the identifier IdE. Optionally, the backup server informs the communication terminal that the set of data has been successfully saved.

In the optional step E6, the client interface IC of the communication terminal TC compares the integrity of the set of data Ens saved in each of the selected backup servers $SV_n$, in order to abandon a faulty backup server if any, and to select another backup server by collaborating with the optimization module OPT.

The user can then access the set of data backed-up at any time within one of the backup servers from the communication terminal by means of the identifier IdE or keywords characterizing the set of data.

The invention described here pertains to a method and terminal for backing up data over a telecommunications network. According to one embodiment of the invention, the steps of the inventive method are determined by the instructions of a computer program incorporated into a terminal, such as the communication terminal TC. The program comprises program instructions, which when said program is loaded and executed within the terminal, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method for backing up a user's set of data over a telecommunications network, comprising the following steps within a terminal:
retrieving, from an application server, a table containing sets of risk factors respectively associated with backup servers, wherein each set of risk factors relate to a backup server comprises at least one factor selected from the group consisting of an earthquake risk factor, a cyclone risk factor, a flooding risk factor, a temperature scale risk factor, and a political stability factor;

assigning a trust level to each backup server identified within the table based on all of the risk factors associated with the backup server;

selecting at least three backup servers based on the trust levels respectively assigned to the backup servers; and transmitting the set of data to each selected backup server that saves the set of data.

2. The method according to claim 1, wherein the backup servers are selected based on a backup quality requested by the user.

3. The method according to claim 2, wherein the backup quality is determined by at least one of the following parameters, including the private, public, or professional status of the operator managing each backup server, the desired backup duration of the set of data, and a reliability factor requested by the user with respect to the storage of the set of data.

4. The method according to claim 1, wherein the selected backup servers are respectively managed by different operators.

5. The method according to claim 1, wherein the selected backup servers are partially or fully managed by a single operator.

6. A terminal for backing up a user's set of data over a telecommunications network, comprising:

means for retrieving, from an application server, a table containing sets of risk factors respectively associated with backup servers, wherein each set of risk factors relate to a backup server comprises at least one factor selected from the group consisting of an earthquake risk factor, a cyclone risk factor, a flooding risk factor, a temperature scale risk factor, and a political stability factor;

means for assigning a trust level to each backup server identified within the table based on all of the risk factors associated with the backup server;

means for selecting at least three backup servers based on the trust levels respectively assigned to the backup servers; and means for transmitting the set of data to each selected backup server that saves the set of data.

7. The terminal according to claim 6, further comprising means for comparing an integrity of the set of data saved in each of the selected backup servers.

8. An application server for backing up a user's set of data over a telecommunications network, comprising:

means for determining sets of risk factors respectively associated with backup servers, wherein each set of risk factors relate to a backup server comprises at least one factor selected from the group consisting of an earthquake risk factor, a cyclone risk factor, a flooding risk factor, a temperature scale risk factor, and a political stability factor; and means for transmitting a table containing said sets of risk factors to a terminal in order for the terminal to assign a trust level to each backup server identified within the table based on the risk factors, the means of transmitting being configured to transmit a set of data to at least three selected backup servers based on the trust levels respectively assigned to the backup servers.

9. A non-transitory computer-readable medium having computer executable instructions for performing steps, comprising:

retrieving, from an application server, a table containing sets of risk factors respectively associated with backup servers, wherein each set of risk factors relate to a backup server comprises at least one factor selected from the group consisting of an earthquake risk factor, a cyclone risk factor, a flooding risk factor, a temperature scale risk factor, and a political stability factor;

assigning a trust level to each backup server identified within the table based on all of the risk factors associated with the backup server;

selecting at least three backup servers based on the trust levels respectively assigned to the backup servers; and transmitting the set of data to each selected backup server that saves the set of data.

* * * * *